US012764054B2

(12) United States Patent
Cho et al.

(10) Patent No.: US 12,764,054 B2
(45) Date of Patent: Oct. 13, 2026

(54) DELAY CONTROL SYSTEM FOR IMPROVED NETWORK CODING OF BIDIRECTIONAL TRAFFIC

(71) Applicant: CHUNG ANG UNIVERSITY INDUSTRY ACADEMIC COOPERATION FOUNDATION, Seoul (KR)

(72) Inventors: Sung Rae Cho, Seongnam-si (KR); Dong Hyun Lee, Seoul (KR); Yun Seong Lee, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 100 days.

(21) Appl. No.: 18/885,839

(22) Filed: Sep. 16, 2024

(65) Prior Publication Data

US 2025/0168102 A1 May 22, 2025

(30) Foreign Application Priority Data

Nov. 16, 2023 (KR) ........................ 10-2023-0159339

(51) Int. Cl.
*H04L 45/121* (2022.01)
*H04L 45/12* (2022.01)

(52) U.S. Cl.
CPC .......... *H04L 45/121* (2013.01); *H04L 45/123* (2013.01)

(58) Field of Classification Search
None
See application file for complete search history.

(56) References Cited

U.S. PATENT DOCUMENTS 12,213,051 B1 * 1/2025 Xie ........................ H04W 40/02
2011/0026429 A1 * 2/2011 Ben Slimane ........ H04L 1/0026 370/252
2013/0265872 A1 * 10/2013 Noh ................... H04B 7/15542 370/232

(Continued)

OTHER PUBLICATIONS

IEEE journal paper "Coding-Aware Multi-path Routing in Multi-Hop Wireless Networks" (2008) to Han et al. ("Han") (Year: 2008).*

*Primary Examiner* — June Sison
(74) *Attorney, Agent, or Firm* — Bridgeway IP Law Group, PLLC; Jihun Kim

(57) ABSTRACT

Embodiments relate to a delay control system for improving network coding of bidirectional traffic, and more particularly to a delay control system for improving network coding of bidirectional traffic that sets a path with a constraint on time in an IIoT network and controls new network coding-aware routing capable of efficiently utilizing opportunities for network coding, and the delay control system for improving network coding of bidirectional traffic includes an intermediate node request collector configured to receive a route request (RREQ) packet transmitted from a source node, an intermediate node calculator configured to calculate a deadline between the source node and a destination node based on the RREQ packet received by the intermediate node request collector, and an intermediate node request transmitter configured to transmit the RREQ packet through an optimal path between the source node and the destination node based on the deadline.

8 Claims, 3 Drawing Sheets

(56) References Cited

U.S. PATENT DOCUMENTS

| | | | | |
|---|---|---|---|---|
| 2015/0271062 | A1* | 9/2015 | Vijayasankar .......... | H04L 45/22<br>370/252 |
| 2022/0095198 | A1* | 3/2022 | Zhang .................. | H04W 40/20 |

* cited by examiner

DELAY CONTROL SYSTEM FOR IMPROVED NETWORK CODING OF BIDIRECTIONAL TRAFFIC

CROSS-REFERENCE TO RELATED APPLICATIONS

This application claims the priority of Korean Patent Application No. 10-2023-0159339 filed on Nov. 16, 2023, in the Korean Intellectual Property Office, the disclosure of which is incorporated herein by reference.

TECHNICAL FIELD

The present invention relates to a delay control system for improving network coding of bidirectional traffic, and more particularly to a delay control system for improving network coding of bidirectional traffic that sets a path with a constraint on time in an Industrial Internet of Things (IIoT) network and controls new network coding-aware routing capable of efficiently utilizing opportunities for network coding.

BACKGROUND ART

IIOT refers to devices such as sensors and equipment interconnected by networks together with industrial sectors of computers, including manufacturing and energy management. This technology facilitates improvement of data collection, exchange, analysis, production, and efficiency and realizes economic advantages through this connection. In other words, IIOT is a technology that collects and analyzes data by connecting sensors and machines on the Internet in an industrial environment. In multi-hop and large IIoT environments, an IIoT application periodically generates and transmits more packets such as detection data, video surveillance data, and production control data than in a typical IoT environment. Therefore, IIoT places importance on delay of transmission for work accuracy and safety, and requires transmission path setting capable of minimizing delay.

However, when a transmission path is routed focusing on delay and transmission waiting time to meet requirements in the IIoT environment, network interference may greatly increase and available wireless resources may saturate. Therefore, most studies related to the technology have proposed a network transmission technique using interference avoidance technology such as Successive Interference Cancellation (SIC), or have proposed a transmission system based on network coding. Here, SIC is technology used by a receiver in wireless data transmission, and is technology capable of decoding two or more packets arriving at the same time. SIC is achieved by the receiver decoding a stronger signal first, subtracting the signal from a combined signal, and then decoding a difference therebetween using a weaker signal. In addition, the transmission system based on network coding provides opportunities for resource reuse and improves network throughput, and opportunities and performance gain increase as wireless IIOT networks become denser and more widespread.

However, conventional interference avoidance-related technologies increase the use of inefficient resources, and tend to increase computing complexity as the number of IIoT nodes increases. In addition, the transmission system based on network coding has several major problems with regard to network coding, such as network coding-aware routing, packet encoding and decoding, signal synchronization, information caching, error correction, and resource allocation.

DISCLOSURE

Technical Problem

The present invention takes these problems into account, and the present invention provides a delay control system that maximizes network coding gain based on a fully distributed routing scheme through Network Coding-Aware Delayed Store and Forward (NC-DSF), which is a low-complexity system allowed to be easily mixed with a passive or active network coding-aware routing scheme, and improves network coding of bidirectional traffic that controls end-to-end routing delay.

Technical Solution

A delay control system for improving network coding of bidirectional traffic according to embodiments of the present invention includes an intermediate node request collector configured to receive a route request (RREQ) packet transmitted from a source node, an intermediate node calculator configured to calculate a deadline between the source node and a destination node based on the RREQ packet received by the intermediate node request collector, and an intermediate node request transmitter configured to transmit the RREQ packet through an optimal path between the source node and the destination node based on the deadline.

In embodiments of the present invention, the intermediate node request collector may collect the RREQ packet including bidirectional link state data between n types of source nodes and the destination node at an intermediate node.

In embodiments of the present invention, the intermediate node calculator may be configured to determine the deadline which is an optimal delay time according to bidirectional link state data between n types of source nodes and the destination node included in the RREQ packet, and encode necessary information from packets transmitted from the n types of source nodes.

In embodiments of the present invention, the intermediate node calculator may calculate an expected delay time according to bidirectional link state data between n types of source nodes and the destination node included in the RREQ packet, and the delay control system may include a delay time determination unit configured to determine the optimal deadline in the expected delay time.

In embodiments of the present invention, the delay time determination unit may be configured to prevent a packet path from being concentrated on a specific node, and apply a constant value that alleviates the expected delay time according to an amount of algorithm data flow, thereby calculating the deadline using the following equation.

$$f(r, B) = \frac{1}{r^B} * \frac{1}{(|U| - 1)^{B+1}} * \varepsilon_{lim}$$

Here, B denotes a number of bidirectional data flows using a link, |B| denotes a total number of user nodes of the system, $\varepsilon_{lim}$ denotes a maximum number of end-to-end routing delays, r denotes a constant value that alleviates the expected delay time, and f(r, B) denotes an expected delay time for B.

In embodiments of the present invention, the delay time determination unit applies a shortest delay value allowed to be handled by each node to control delay of the RREQ packet at a relay node due to hardware and software limitations and calculates the deadline that alleviates overload of a node with shortest delivery delay using the following equation.

$$f\left(w, r, \bar{b}(t), \bar{B}, B\right) = \frac{1}{r^{B(t)}} * \frac{1}{(|U| - 1)^{\bar{B}(t)+1}} * \varepsilon_{lim}, \left(B(t) \le \bar{B}\right)$$

Here, |U| denotes a total number of user nodes of the system, Elim denotes a maximum number of end-to-end routing delays, r denotes a constant value that alleviates the expected delay time, B(t) denotes a number of bidirectional data flows using a link at all instances t, $\bar{B}(t)$ denotes a bidirectional time function that changes depending on a degree of remaining resources in all instances t, w denotes a control weight for load balancing, and f(w, r, $\bar{b}(t)$, $\bar{B}$, B) denotes a deadline.

In embodiments of the present invention, $\bar{B}(t)$ may control decreases in network load balancing and resource utilization due to burst traffic on some node paths as B(t) increases, and may be calculated by the following equation.

$$\bar{B}(t) = B(t)\left(1 - w\frac{B(t)}{B}\right), 0 \le w \le 1$$

Here, w denotes a control weight for load balancing.

In embodiments of the present invention, the intermediate node calculator may recognize network coding of a fully distributed routing scheme that controls delay based on flooding-based network coding-award delayed store and forward (NC-DSF).

In embodiments of the present invention, the intermediate node calculator may further include a delay time flooding unit configured to apply (flood) the deadline to an adjacent node (two-hop).

In embodiments of the present invention, the intermediate node request transmitter may be configured to transmit an RREQ packet encoded at an intermediate node to the destination node along a path having shortest transmission delay based on the deadline, and transmit a route reply (RREP) packet corresponding to the encoded RREQ packet transmitted from the destination node to the source node.

Advantageous Effects

According to the delay control system for improving network coding of bidirectional traffic described above, the following effects are achieved.

First, an NC-DSF method, which considers all network traffic flows, may set a maximum bidirectional path useful for network coding and maximize the bidirectional path.

Second, network coding opportunities may be maximized from a performance result from a function that calculates delay to maximize bidirectional network coding.

Third, an NC-DSF system may maximize network coding gain and control end-to-end routing delay.

MODE FOR INVENTION

Figure 1:
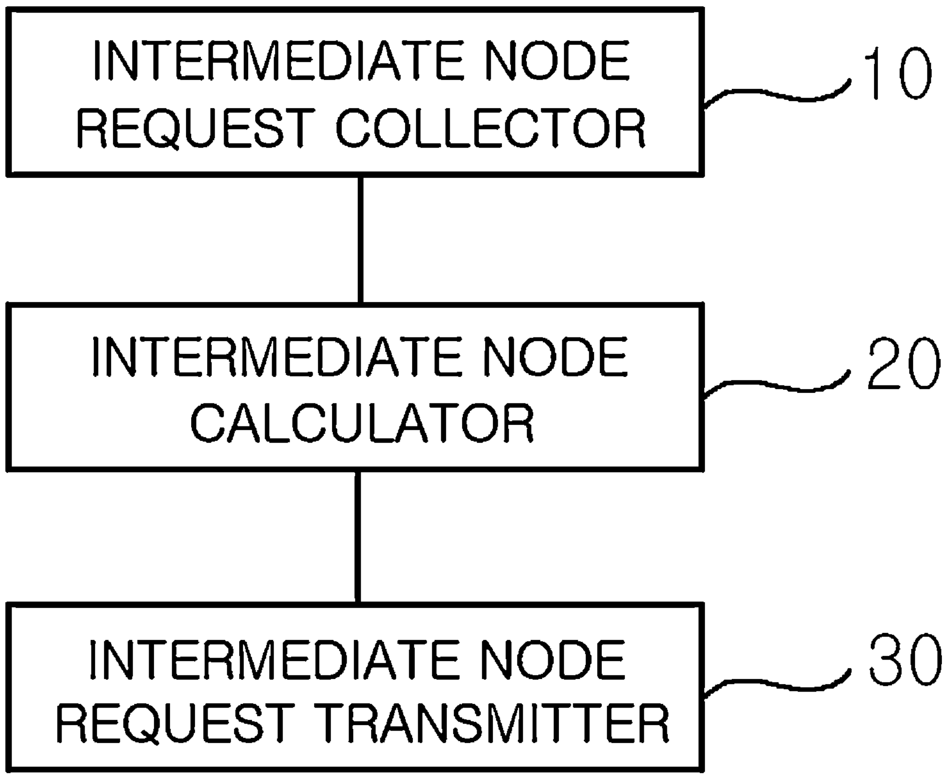
FIG. 1 is a configuration diagram of a delay control system for improving network coding of bidirectional traffic according to an embodiment of the present invention.

A delay control system for improving network coding of bidirectional traffic according to embodiments of the present invention will be described in detail with reference to the accompanying drawings. Since the present invention may undergo various changes and have various forms, specific embodiments will be illustrated in the drawings and described in detail in the text. However, this is not intended to limit the present invention to a specific form disclosed, and should be understood to include all modifications, equivalents, or substitutes included in the spirit and scope of the present invention. Like reference numerals have been used for like elements throughout the description of each figure. In the accompanying drawings, dimensions of structures are illustrated to be enlarger than actual ones for clarity of the present invention, or reduced compared to actual ones for understanding of schematic configurations.

In addition, even though terms such as first and second may be used to describe various components, the components should not be limited by the terms. The terms are only used for the purpose of distinguishing one component from another. For example, a first component may be referred to as a second component, and similarly, the second component may be may be referred to as the first component, without departing from the scope of the present invention. Meanwhile, unless defined otherwise, all terms used herein, including technical or scientific terms, have the same meaning as commonly understood by a person of ordinary skill in the art to which the present invention pertains. Terms such as those defined in commonly used dictionaries should be interpreted as having meanings consistent with meanings in the context of the related art, and should not be interpreted as having ideal or excessively formal meanings unless explicitly defined in the present application.

The present invention is a technology that proposes new network coding-aware routing control technique capable of setting a path with a constraint on time in an IIoT network and efficiently utilizing network coding opportunities.

FIG. 1 is a configuration diagram of a delay control system for improving network coding of bidirectional traffic according to an embodiment of the present invention.

Referring to FIG. 1, the delay control system for improving network coding of bidirectional traffic includes an intermediate node request collector 10, an intermediate node calculator 20, and an intermediate node request transmitter 30. The intermediate node request collector 10 receives an RREQ packet transmitted from a source node. That is, an intermediate node collects the RREQ packet including bidirectional link state data between n types of source nodes and a destination node, and the intermediate node calculator 20 calculates a deadline between the source node and the destination node based on the RREQ packet received from the intermediate node request collector 10. Finally, the intermediate node request transmitter 30 transmits the RREQ packet through an optimal path between the source node and the destination node based on the deadline. That is, to describe in more detail, the intermediate node request transmitter 30 transmits the RREQ packet encoded at the intermediate node to the destination node along a path having the shortest transmission delay based on the deadline, and transmits a RREP packet corresponding to the encoded RREQ packet transmitted from the destination node to the source node. Here, to describe the path having the shortest transmission delay in more detail, the encoded RREQ packet is transmitted to a next node after delay set based on the deadline, and when routing through the encoded RREQ packet is completed, a path capable of maximizing network coding is set.

Figure 2:
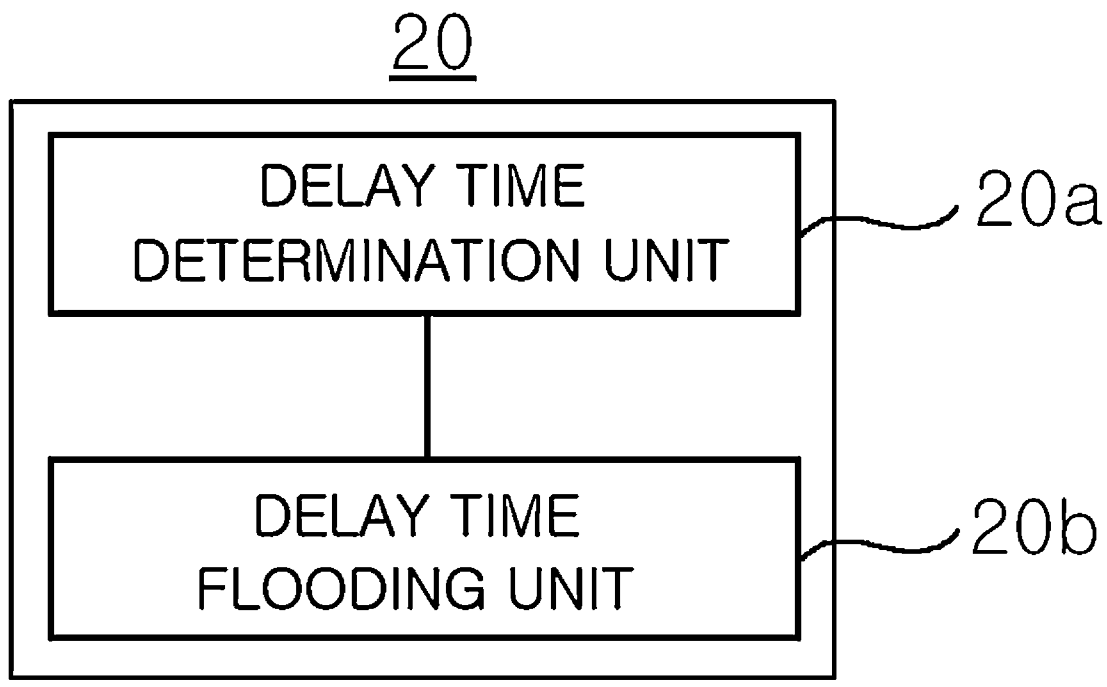
FIG. 2 is a configuration diagram illustrating an intermediate node calculator of the delay control system for improving network coding of bidirectional traffic according to an embodiment of the present invention.

FIG. 2 is a configuration diagram illustrating an intermediate node calculator of the delay control system for improving network coding of bidirectional traffic according to an embodiment of the present invention.

Referring to FIG. 2, the intermediate node calculator 20 includes a delay time determination unit 20*a* and a delay time flooding unit 20*b*. The intermediate node calculator 20 determines the deadline, which is the optimal delay time according to the bidirectional link state data between the n types of source nodes and the destination node included in the RREQ packet, and encodes necessary information from packets transmitted from the n types of source nodes.

Here, the delay time determination unit 20*a* calculates an expected delay time according to the bidirectional link state data between the n types of source nodes and the destination node included in the RREQ packet, and determines the most optimal deadline in the expected delay time. That is, to describe in more detail, the delay time determination unit 20*a* prevents the packet path from being concentrated on a specific node and applies a constant value that alleviates the expected delay time according to the amount of algorithm data flow, thereby calculating the deadline through the following Equation 1.

$$f(r, B) = \frac{1}{r^B} * \frac{1}{(|U|-1)^{B+1}} * \varepsilon_{lim} \qquad \text{[Equation 1]}$$

Here, B denotes the number of bidirectional data flows using the link, |B| denotes the total number of user nodes of the system, $\varepsilon_{lim}$ denotes the maximum number of end-to-end routing delays, r denotes a constant value that alleviates the expected delay time, and f(r, B) denotes an expected delay time for B. As B increases, f(r, B) becomes significantly smaller, and fairly fast and accurate RREQ packet delay control is required at a relay node. Therefore, to solve this problem, the highest bidirectional constant, $\overline{B}$, was introduced. Therefore, a shortest delay value that may be handled by each node is applied to control the delay of the RREQ packet at the relay node due to hardware and software limitations based on $\overline{B}$, thereby calculating the deadline that alleviates the overload of the node with the shortest delivery delay, and the deadline may be calculated as in the following Equation 2.

$$f\left(w, r, \overline{b}(t), \overline{B}, B\right) = \frac{1}{r^{\overline{B}(t)}} * \frac{1}{(|U|-1)^{\overline{B}(t)+1}} * \varepsilon_{lim}, \left(B(t) \le \overline{B}\right) \qquad \text{[Equation 2]}$$

However, f(w, r, $\overline{b}$(t), $\overline{B}$, B)=f(0), (B(1)>$\overline{B}$(t)). Here, |U| denotes the total number of user nodes of the system, $\varepsilon_{lim}$ denotes the maximum number of end-to-end routing delays, r denotes a constant value that alleviates the expected delay time, B(t) denotes the number of bidirectional data flows using the link at all instances t, $\overline{B}$(t) denotes a bidirectional time function that changes depending on the degree of remaining resources in all instances t, w denotes a control weight for load balancing, and f(w, r, $\overline{b}$(t), $\overline{B}$, B) denotes a deadline.

In addition, $\overline{B}$(t) is a bidirectional variable that controls decreases in network load balancing and resource utilization due to burst traffic on some node paths as B(t) increases, and is calculated by the following Equation 3.

$$\overline{B}(t) = B(t)\left(1 - w\frac{B(t)}{\overline{B}}\right), 0 \le w \le 1 \qquad \text{[Equation 3]}$$

Here, w denotes a control weight for load balancing. In addition, the delay time flooding unit 20*b* floods the deadline to an adjacent node (two-hop).

Figure 3:
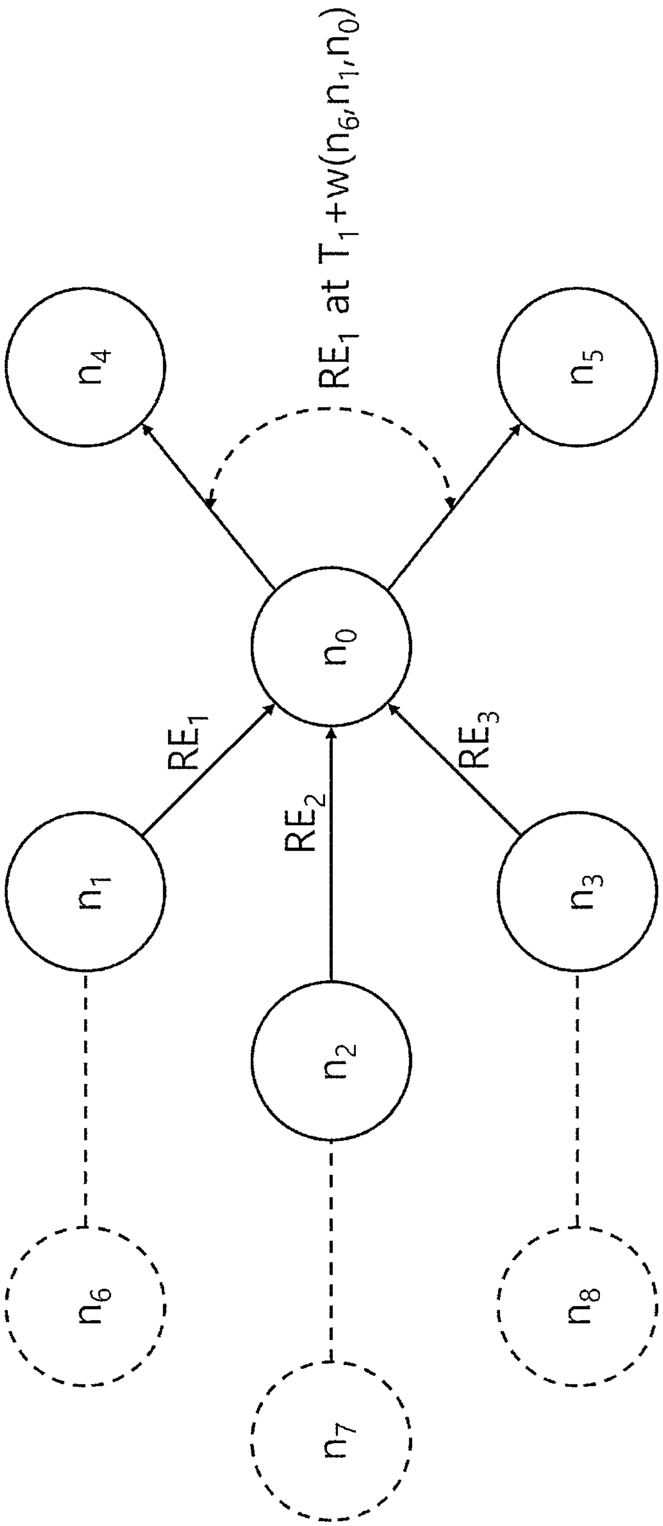
FIG. 3 is a schematic view illustrating an NC-DSF system model based on new flooding considering a two-hop link state to increase network coding opportunities in the delay control system for improving network coding of bidirectional traffic according to an embodiment of the present invention.

FIG. 3 is a schematic view illustrating an NC-DSF system model based on new flooding considering a two-hop link state to increase network coding opportunities in the delay control system for improving network coding of bidirectional traffic according to an embodiment of the present invention.

Referring to FIG. 3, the intermediate node calculator 20 recognizes network coding of a fully distributed routing scheme that controls delay based on flooding-based NC-DSF. That is, to describe in more detail, a fully distributed routing scheme that controls the delay referred to as NC-DSF is proposed. As a low-complexity system that may be easily mixed with an existing passive or active network coding-aware routing scheme, the NC-DSF system maximizes network coding gain and controls end-to-end routing delay. Considering all network traffic flows, the NC-DSF method sets a maximum bidirectional path useful for network coding, and maximizing the bidirectional path means increasing the opportunity for network coding. An algorithm for creating a bidirectional path is a core part of this invention, and first performs delaying according to the deadline before delivering the RREQ packet received according to the link state and network topology as dynamic source routing (DSR). The deadline is a function that calculates delay to maximize bidirectional network coding and maximizes network coding opportunities in performance results. After delay set through the delay function, the RREQ is transmitted to the next node, and when routing through the RREQ is completed, a path capable of maximizing network coding is set.

Therefore, the present invention provides a delay control system for maximizing network coding gain based on the fully distributed routing scheme that controls delay through NC-DSF, which is a low-complexity system that may be easily mixed with a passive or active network coding-aware routing scheme, and improving network coding of bidirectional traffic that controls end-to-end routing delay. According to the delay control system for improving network coding of bidirectional traffic described above, the following effects are achieved. First, an NC-DSF method, which considers all network traffic flows, may set a maximum bidirectional path useful for network coding and maximize the bidirectional path. Second, network coding opportunities may be maximized from a performance result from a function that calculates delay to maximize bidirectional network coding. Third, an NC-DSF system may maximize network coding gain and control end-to-end routing delay.

Even though the detailed description of the present invention described above has been given with reference to preferred embodiments of the present invention, those skilled in the art or those having ordinary knowledge in the art may understand that the present invention may be variously modified and changed within the scope not departing from the spirit and technical scope of the present invention described in the claims to be described later.

What is claimed is:

1. A delay control system for improving network coding of bidirectional traffic, the delay control system comprising:

an intermediate node request collector configured to receive a route request (RREQ) packet transmitted from a source node;

an intermediate node calculator configured to calculate an expected delay time according to bidirectional link state data between n types of source nodes and a destination node included in the RREQ packet and to determine a deadline of an optimal value within the expected delay time by applying a flooding-based network coding-aware delayed store and forward (NC-DSF) scheme; and an intermediate node request transmitter configured to transmit the RREQ packet through an optimal path between the source node and the destination node based on the deadline, wherein the NC-DSF scheme determines the deadline of the optimal value based on a number of bidirectional data flows (B) using a link and a total number of user nodes (|U|) in the delay control system to create network coding opportunities.

2. The delay control system according to claim 1, wherein the intermediate node request collector collects the RREQ packet including the bidirectional link state data between the n types of source nodes and the destination node at an intermediate node.

3. The delay control system according to claim 1, wherein the intermediate node calculator is configured to:

determine the deadline which is an optimal delay time according to the bidirectional link state data between the n types of source nodes and the destination node included in the RREQ packet, and encode necessary information from packets transmitted from the n types of source nodes.

4. The delay control system according to claim 1, wherein the intermediate node calculator is configured using the following equation:

$$f(r, B) = \frac{1}{r^{B}} * \frac{1}{(|U|-1)^{B+1}} * \varepsilon_{lim}$$

(B denotes the number of bidirectional data flows using the link, |U| denotes the total number of user nodes in the delay control system, $\varepsilon_{lim}$ denotes a maximum number of end-to-end routing delays, r denotes a constant value that alleviates the expected delay time, and f(r, B) denotes an expected delay time for B).

5. The delay control system according to claim 1, wherein the intermediate node calculator applies a shortest delay value allowed to be handled by each node to control delay of the RREQ packet at a relay node due to hardware and software limitations and calculates the deadline according to the NC-DSF scheme using the following equation:

$$f\left(w, r, \overline{b}(t), \overline{B}, B\right) = \frac{1}{r^{B(t)}} * \frac{1}{(|U|-1)^{\overline{B}(t)+1}} * \varepsilon_{lim}, \left(B(t) \le \overline{B}\right)$$

(|U| denotes the total number of user nodes in the delay control system, $\varepsilon_{lim}$ denotes a maximum number of end-to-end routing delays, r denotes a constant value that alleviates the expected delay time, B(t) denotes the number of bidirectional data flows using the link at all instances t, $\overline{B}(t)$ denotes a bidirectional time function that changes depending on a degree of remaining resources in all instances t, w denotes a control weight for load balancing, and f(w, r, $\overline{b}(t)$, $\overline{B}$, B) denotes a deadline).

6. The delay control system according to claim 5, wherein $\overline{B}(t)$ controls decreases in network load balancing and resource utilization due to burst traffic on some node paths as B(t) increases, and is calculated by the following equation:

$$\overline{B}(t) = B(t)\left(1 - w\frac{B(t)}{B}\right), 0 \le w \le 1$$

(w denotes a control weight for load balancing).

7. The delay control system according to claim 1, further comprising a delay time flooding function configured to apply (flood) the deadline to an adjacent node (two-hop) to synchronize the network coding opportunities within the NC-DSF scheme.

8. The delay control system according to claim 1, wherein the intermediate node request transmitter is configured to:

transmit the RREQ packet encoded at an intermediate node to the destination node along a path having shortest transmission delay based on the deadline, and transmit a route reply (RREP) packet corresponding to the encoded RREQ packet transmitted from the destination node to the source node.

* * * * *